United States Patent [19]

Okamoto et al.

[11] Patent Number: 5,214,754
[45] Date of Patent: May 25, 1993

[54] METHOD AND APPARATUS FOR APPROXIMATING POLYGONAL LINE TO CURVE

[75] Inventors: Masayuki Okamoto, Yokohama; Mitsuru Yamauchi, Inagi; Toshiya Mima, Kawasaki, all of Japan

[73] Assignee: Fujitsu Limited, Kanagawa, Japan

[21] Appl. No.: 795,253

[22] Filed: Nov. 19, 1991

Related U.S. Application Data

[63] Continuation of Ser. No. 367,813, Jun. 19, 1989, abandoned.

[30] Foreign Application Priority Data

Jun. 29, 1988 [JP] Japan .................. 63-159208
Sep. 7, 1988 [JP] Japan .................. 63-222438

[51] Int. Cl.$^5$ .................................. G06F 15/20
[52] U.S. Cl. .................................. 395/142
[58] Field of Search ............... 395/142, 143; 340/720, 340/721, 723; 382/44–48

[56] References Cited

U.S. PATENT DOCUMENTS 3,860,805  0/1975  Strukel .
5,115,404  5/1992  Lo et al. ................. 395/143
5,136,689  8/1992  Waller ................... 395/143

FOREIGN PATENT DOCUMENTS 60-15773  1/1985  Japan .

OTHER PUBLICATIONS

Fujio Yamaguchi, "Shape Processing Technology by Computer Display (II)", Nikkan Industry, Tokyo, Japan, pp. 10–15, 1982.

Chaikin, George M., "An Algorithm for High Speed Curve Generation." *Computer Graphics and Image Processing,* vol. 3, pp. 346–349, 1979.

"A Survey of Curve and Surface Methods in CAGD", Wolfgang Bohm, Gerald Farin, and Jurgen Kahmann, Computer Aided Geometric Design, vol. 1, (1984) Jan. 1960, pp. 6–11.

"An Algorithm for High-Speed Curve Generation", George M. Chaikin, Computer Graphics and Image Processing, vol. 3 (1974), pp. 346–349.

*Primary Examiner*—Heather R. Herndon
*Attorney, Agent, or Firm*—Nikaido, Marmelstein, Murray & Oram

[57] ABSTRACT

A computer graphic apparatus uses a method and apparatus to approximate a polygonal line of a plurality of line segments ($L_1, L_2 \ldots$) to a curve (X). The curve is divided into two curve portions ($P_{10}P_{11}$, $P_{11}P_{02}$) at a division point ($P_{11}$). An error (e) between a line segment ($\overline{P_{01}P_{02}}$) linking the start and end points ($P_{01}$, $P_{02}$) of the curve and the division point is compared with a predetermined value ($V_{th}$). When the error is small, the line segment is treated as one part of the polygonal line, but in another case, the above-mentioned process is repeated.

15 Claims, 13 Drawing Sheets

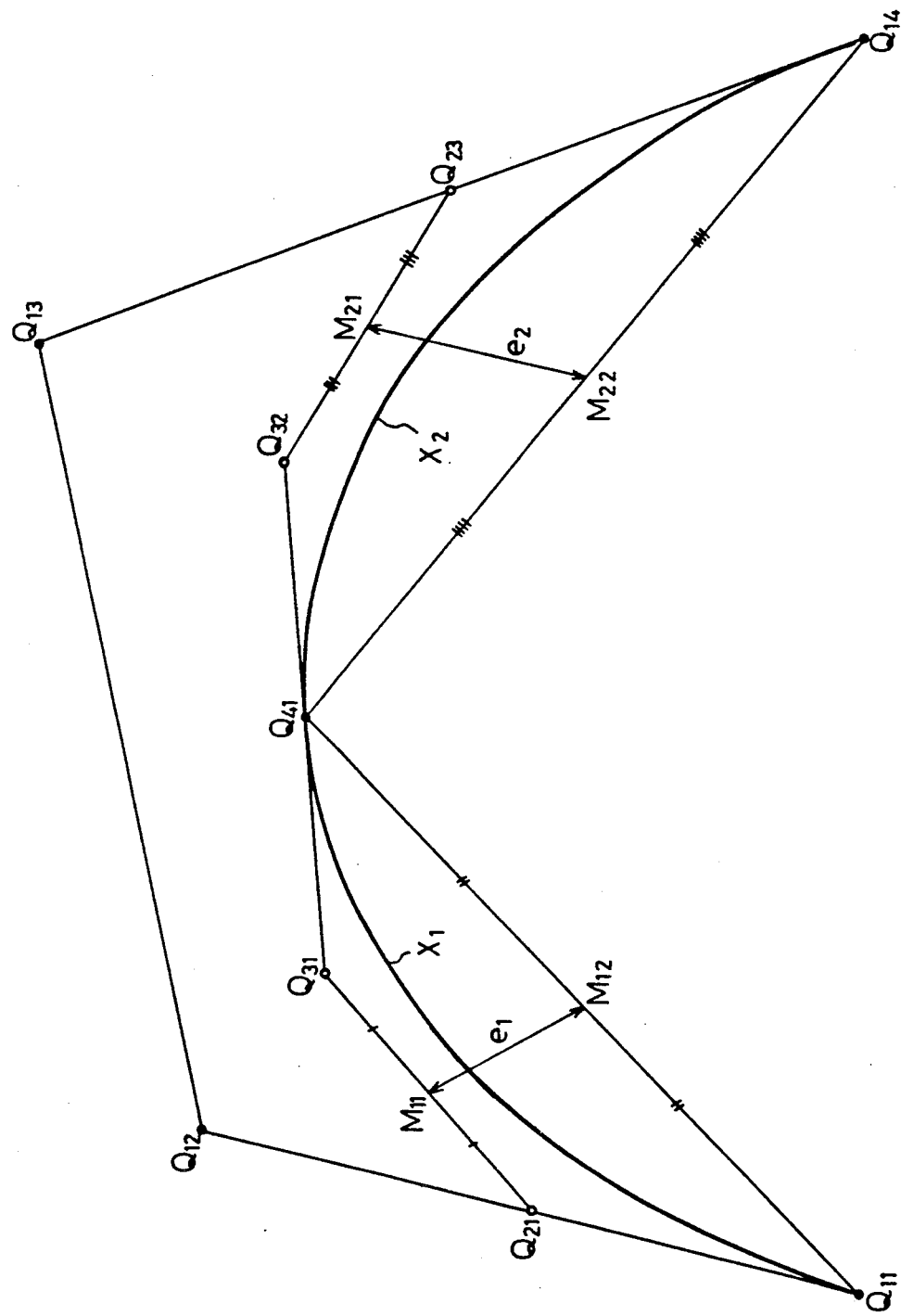

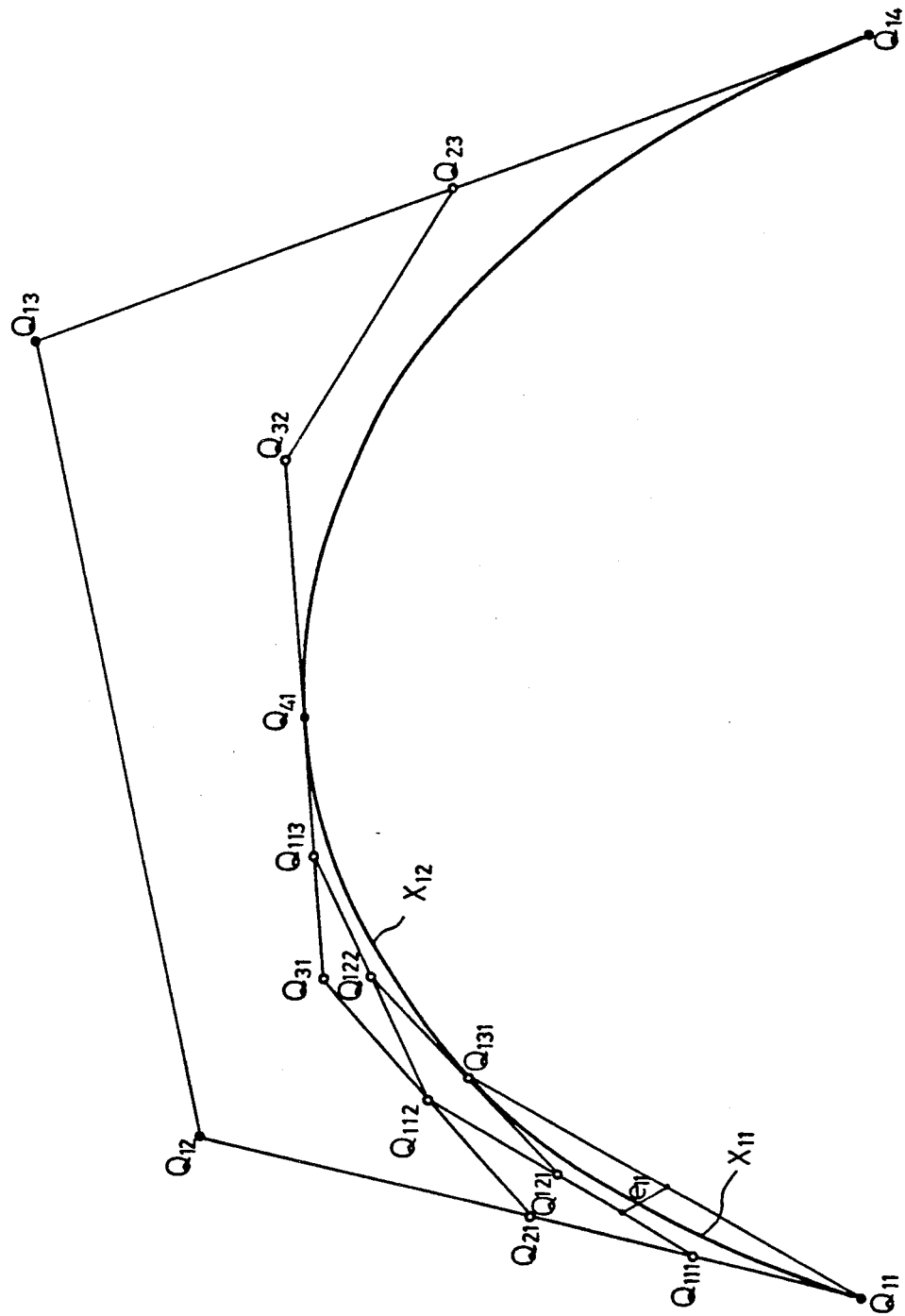

METHOD AND APPARATUS FOR APPROXIMATING POLYGONAL LINE TO CURVE

This application is a continuation of application Ser. No. 367,813 filed Jun. 19, 1989 now abandoned.

BACKGROUND OF THE INVENTION

1. Field of the Invention

The present invention relates to a method and apparatus for approximating a polygonal line to a curve used in a computer graphic display unit, a graphic printing unit and the like.

2. Description of the Related Art

Generally, in a computer graphic display unit, a graphic printing unit, or the like, a complex process is required when wishing to directly generate a curve for a display thereof, and therefore, as an alternative, a polygonal line is approximated to a curve and a plurality of line segments corresponding thereto are generated and displayed.

In a prior art method of approximating a polygonal line for a curve, for example, a curve is divided into a predetermined number of parts, and only the coordinates of division points on the curve are calculated, and then the curve is approximated by a polygonal line having a plurality of line segments linking the above-mentioned coordinates on the curve.

Nevertheless, to obtain a precise display of a curve having a large curvature by a polygonal line, the number of divisions, i.e., the number of line segments, must be increased, thus increasing the processing time and the data amount. On the other hand, the precision for a curve having a small curvature is too high.

SUMMARY OF THE INVENTION

Therefore, an object of the present invention is to approximate a polygonal line to a curve without increasing the processing time and the data amount.

According to the present invention, in a computer graphic apparatus or the like, to approximate a polygonal line to a curve, the curve is divided into two curve portions at a division point, and an error between a line segment linking the start and end points of the curve and the division point is compared with a predetermined value. When the error is small, the line segment is treated as one polygonal line, but in other cases, the above-mentioned process is repeated.

As a result, the number of divisions, i.e., the number of line segments, is large for a curve (curve portion) having a large curvature, but the number of divisions, i.e., the number of line segments, is small for a curve (curve portion) having a small curvature. Namely, the number of divisions, i.e., the number of line segments, for a curve is changed in accordance with the curvature thereof, and the curve is effectively and smoothly approximated to a polygonal line of a plurality of line segments without increasing the processing time and the date amount.

BRIEF DESCRIPTION OF THE DRAWINGS

The present invention will be more clearly understood from the description as set forth below with reference to the accompanying drawings, wherein;

FIGS. 13A, 13B, 13C, and 13D are diagrams for explaining a cubic Bezier curve to which a further embodiment of the present invention is applied;

DESCRIPTION OF THE PREFERRED EMBODIMENTS

Figure 1:
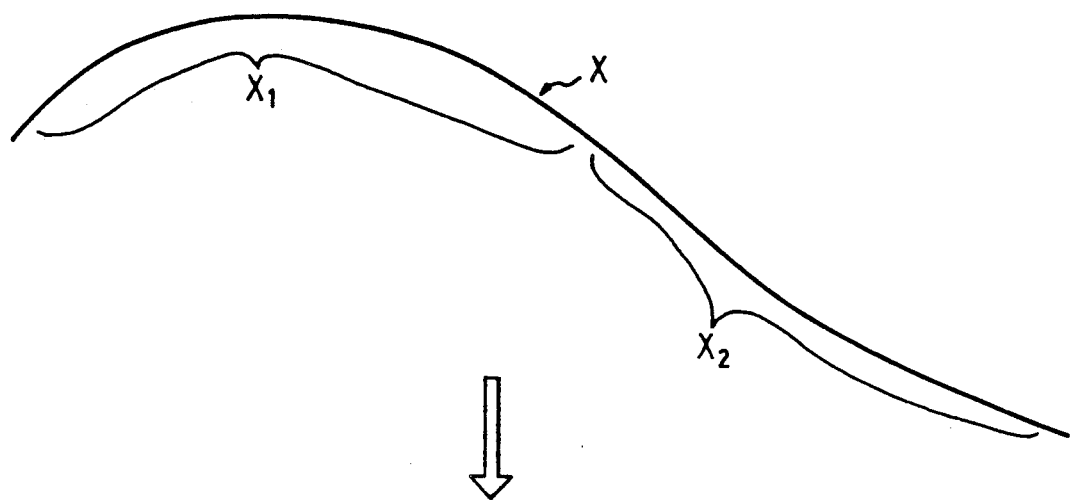
FIG. 1 is a diagram illustrating the principle of the present invention.

In FIG. 1, which illustrates the principle of the present invention, a curve x is approximated to a polygonal line Y having a plurality of line segments $L_1$, $L_2$, ..., $L_n$ divided by division points $P_0$, $P_1$, ... $P_n$ on the curve X. According to the present invention, the number of division points $P_0$, $P_2$, ..., i.e., the number of line segments $L_1$, $L_2$, ..., is large for a curve portion $X_1$ having a large curvature, thus obtaining a high precision. On the other hand, the number of division points $P_{k-1}$, $P_k$, ..., $P_n$, i.e., the number of line segments $L_k$, $L_{k+1}$, ..., $L_n$, is small for a curve portion $X_2$ having a small curvature, thus decreasing the data amount.

Figure 2:
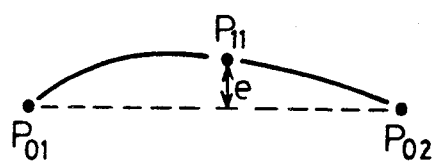
FIG. 2 is a diagram explaining the generation of a line segment according to the present invention.

To realize the principle of the present invention of FIG. 1, as illustrated in FIG. 2, a curve $P_{01}P_{02}$ is divided into two curve portions $P_{01}P_{11}$ and $P_{11}P_{02}$ at a division point $P_{11}$, and an error e between a line segment $\overline{P_{01}P_{02}}$ and the division point $P_{11}$ is calculated. As a result, when the error e is small, the above-mentioned line segment $\overline{P_{01}P_{02}}$ is treated as polygonal line data, and when the error e is large, the above-mentioned dividing process is repeated to perform an approximation of a polygonal line for the curve.

Figure 3:
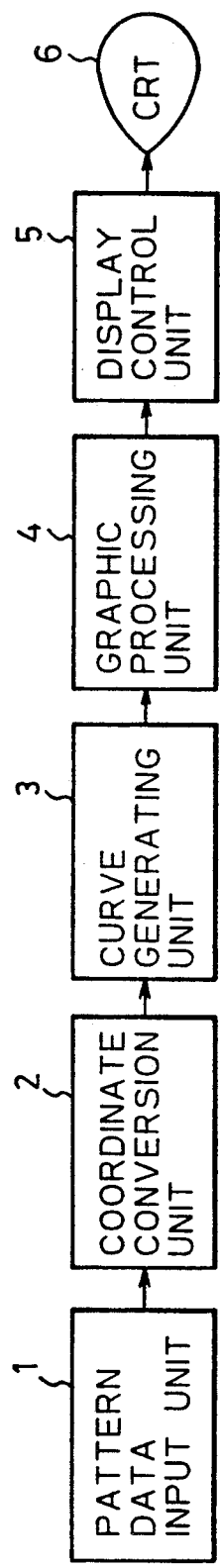
FIG. 3 is a block circuit diagram illustrating a graphic display unit to which a polygonal line approximation apparatus according to the present invention is applied.

In FIG. 3, which illustrates a graphic display unit to which the present invention is applied, reference 1 designates a diagram data input unit, 2 a coordinate conversion unit, 3 a curve generating unit, 4 a depiction process unit, and 5 a display control unit for controlling a CRT 6. The polygonal line approximation apparatus according to the present invention is used as the curve generating unit 3. Also, the present invention can be applied to a graphic printing unit. In this case, the display control unit 5 and the CRT 6 are replaced by a printing control unit and a printer unit, respectively.

Figure 4:
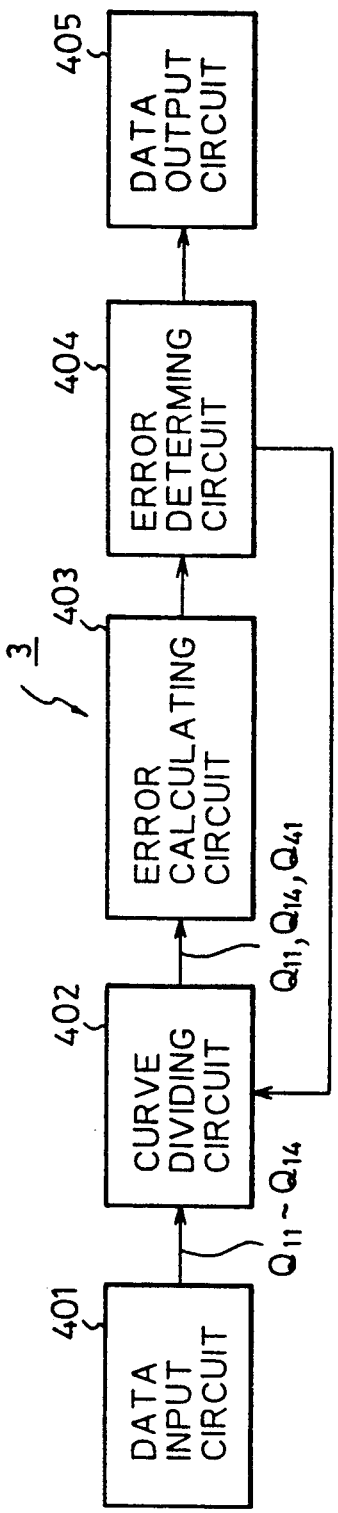
FIG. 4 is a block circuit diagram illustrating an embodiment of the polygonal line approximation apparatus according to the present invention.

In FIG. 4, which illustrates an embodiment of the present invention, a data input circuit 401 processes four coordinates $Q_{11}$ to $Q_{14}$ representing a Bezier curve and transmits them to a curve dividing circuit 402. The curve dividing circuit 402 performs a dividing operation $t_s:1-t_s$ upon a curve of an input coordinate from the data input circuit 401 or a curve of a curve data returned from an error determining circuit 404, and an error calculating circuit 403 calculates an error between the division point of the divided curves and a line segment to be approximated to the curve. The error determining circuit 404 compares the error calculated by the error calculating circuit 403 and a predetermined threshold value of the error. As a result, when the error is smaller than the threshold value, the circuit 404 transmits the data to a data output circuit 405. Conversely, when the error is not smaller than the threshold value, the circuit 404 returns the data to the curve dividing circuit 402. The data output portion 405 performs an output operation upon the data of a polygonal line of a plurality of line segments for an approximated curve.

Each of the circuits 402 and 403 of FIG. 4 will be explained in more detail.

Figure 5:
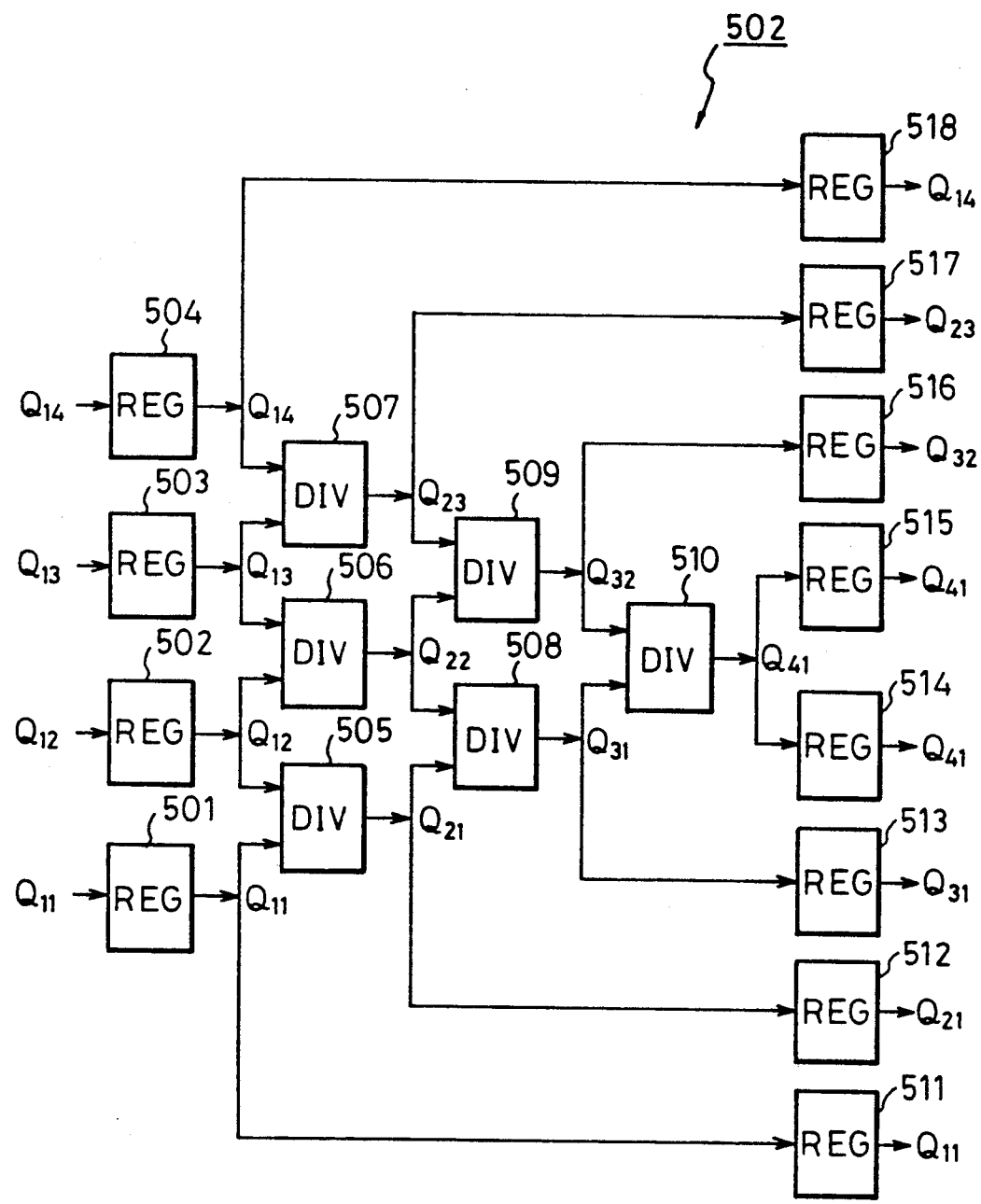
FIG. 5 is a block diagram showing the curve dividing circuit of FIG. 4.
Figure 6:
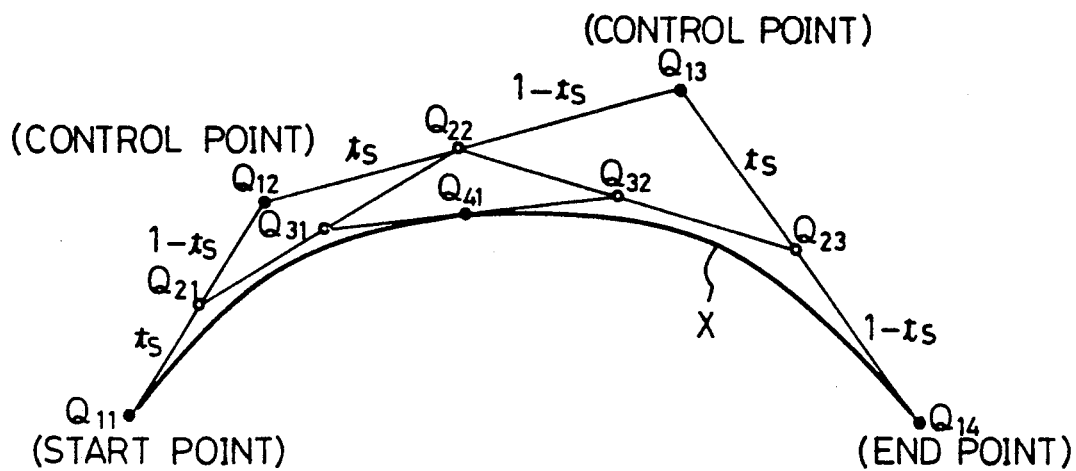
FIG. 6 is a diagram explaining the division of a cubic Beziet curve.
Figure 7:
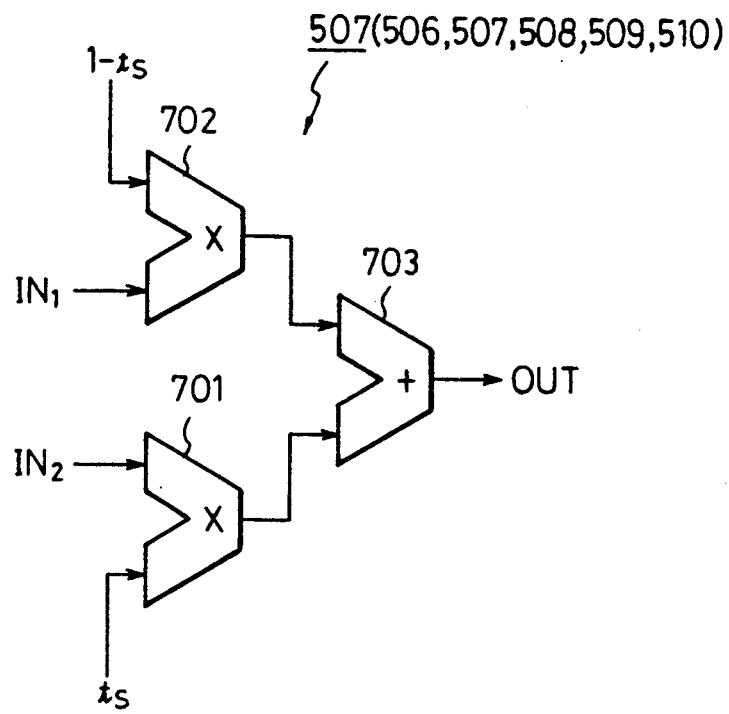
FIG. 7 is a circuit diagram showing the coordinate dividing circuit of FIG. 5.

An example of the curve dividing circuit 402 is a Bezier curve dividing circuit which divides a curve by using a method whereby a curve is divided into two $t_s:1-t_s$, from the characteristics of a cubic Bezier curve (see: George M. Chaikin, "An Algorithm for High Speed Curve Generation", Computer Graphics and Image Processing, vol. 3, pp. 346-349, 1979; and Fujio Yamaguchi, "Shape Processing Technology By Computer Display" (II), Nikkan Industry, Tokyo, pp, 10 to 15, 1982). In FIG. 5, the curve dividing circuit 402 is comprised of registers 501 to 504, coordinate dividing circuits 505 to 510, and registers 511 to 518. Namely, as illustrated in FIG. 7, if coordinates $Q_{11} Q_{14}$ to are given as representing a curve, such coordinates are stored in the registers 501 to 504. The coordinates $Q_{11}$ and $Q_{14}$ are also stored directly in the registers 511 and 518, respectively. The coordinate dividing circuit 505 divides a distance between the coordinates $Q_{11}$ and $Q_{12}$ by the ratio $t_s:1-t_s$, and generates a division coordinate $Q_{21}$ and stores it in the register 512. The coordinate dividing circuit 506 divides a distance between the coordinates and $Q_{13}$ and $Q_{13}$ by the ratio $t_s:1-t_s$, and generates a division coordinate $Q_{22}$. The coordinate dividing circuit 507 divides a distance between the coordinator $Q_{13}$ and $Q_{14}$ by the ratio $t_s:1-t_s$, and generates a division coordinate $Q_{23}$ and stores it in the register 517. Also, the coordinate dividing circuit 508 divides a distance between the coordinates $Q_{21}$ and $Q_{22}$ by the ratio $t_s:1-t_s$, and generates a division coordinate $Q_{31}$. The coordinate dividing circuit 509 divides a distance between the coordinates $Q_{22}$ and $Q_{23}$ by the ratio $t_s:1-t_s$, and generates a division coordinate $Q_{32}$ and stores it in the register 516. Further the coordinate dividing circuit 510 divides a distance between the coordinates $Q_{31}$ and $Q_{32}$ by the ratio $t_s:1-t_s$, and generates a division coordinate $Q_{41}$ and stores it in the registers 514 and 515. At this time, as illustrated in FIG. 6, the coordinate $Q_{41}$ is that on the curve given by $Q_{11}$, $Q_{12}$, $Q_{13}$, and $Q_{14}$ obtained by dividing it by the ratio $t_s:1-t_s$. Simultaneously, at this coordinate $Q_{41}$, the curve is divided into two curves ($Q_{11}$, $Q_{21}$, $Q_{31}$, and $Q_{41}$, $Q_{32}$, $Q_{33}$, and $Q_{14}$).

Note that, in FIG. 5, switching of the data input circuit 401 and the error determining circuit 404 to the input coordinates $Q_{11}$ to $Q_{14}$ of the registers 501 to 504 is carried out by switches (not shown).

Figure 11:
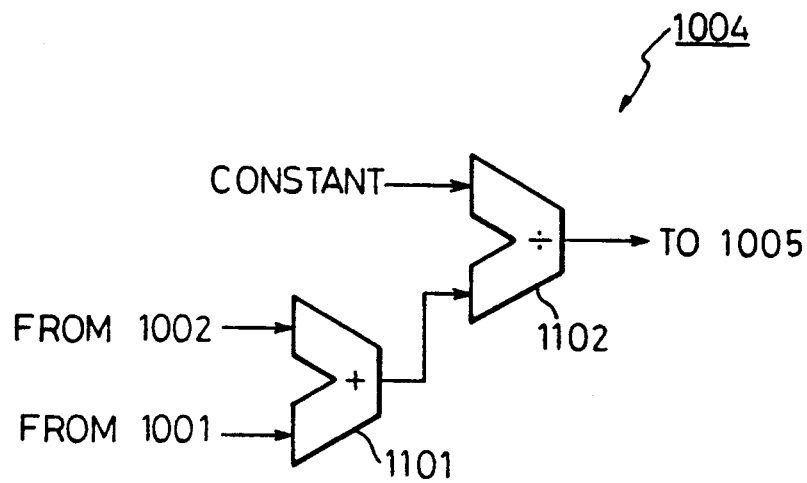
FIG. 11 is a circuit diagram of the middle point calculating circuit of FIG. 9.

As illustrated in FIG. 7, each of the coordinate dividing circuits 505 to 510 of FIG. 5 is comprised of multipliers 701 and 702, and an adder 703. If $t_s$ is $\frac{1}{2}$, the coordinate dividing circuits 505 to 510 can be simplified, i.e., in this case, each of the coordinate dividing circuits can comprise a mean calculating circuit which may be constructed by the configuration as illustrated in FIG. 11 where the constant is 2.

Figure 8:
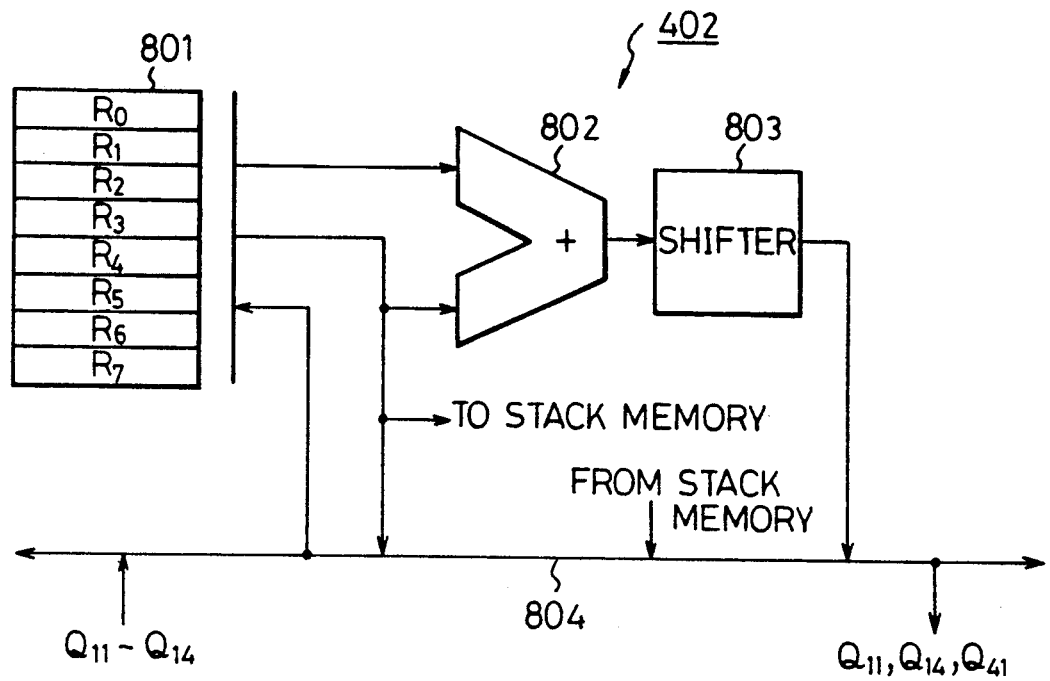
FIG. 8 is another circuit diagram of the curve dividing circuit of FIG. 4.

In FIG. 5, the six coordinate dividing circuits 505 to 510 and the twelve registers 501 to 504 and 511 to 518 must be provided, thus relatively increasing the manufacturing cost. Accordingly, the circuit of FIG. 5 is modified as illustrated in FIG. 8. In FIG. 8, reference numeral 801 designates a three-port register file having registers $R_0$ to $R_7$. In the register file 801, two read operations for two registers and one write operation for one register can be simultaneously carried out. Also, reference numeral 802 designates an adder, 803 an one-bit shifter, and 804 a bus. Note that the shifter 803 serves as a $\frac{1}{2}$ divider, and accordingly, the adder 802 and the shifter 803 correspond to the coordinate dividing circuit 505 of FIG. 7, which calculates an average value of the two input values thereof under the condition that $t_s$ is $\frac{1}{2}$.

The operation of the circuit of FIG. 8 is as follows. Note that the circuit of FIG. 8 is controlled by the microprocessor (not shown). The input data $Q_{11}$ to $Q_{14}$ from the data input circuit 401 of FIG. 4 is stored in the registers $R_0$ to $R_3$, respectively, of the register file 801.

Then, the value $Q_{14}$ of the register $R_3$ is transmitted to the stack memory (not shown). Also, the adder 802 and the shifter 803 calculate a middle point $Q_{23}$ from the values $Q_{14}$ and $Q_{13}$ of the registers $R_3$ and $R_2$, i.e., $Q_{23} \leftarrow (Q_{14}+Q_{13})/2$, and transmits the middle point $Q_{23}$ to the register $R_3$.

Then, the adder 802 and the shifter 803 calculate a middle point $Q_{22}$ from the values $Q_{13}$ and $Q_{12}$ of the registers $R_2$ and $R_1$, i.e., $Q_{22} \leftarrow (Q_{13}+Q_{12})/2$, and transmits the middle point $Q_{22}$ to the register $R_2$.

Thereafter, the adder 802 and the shifter 803 calculate a middle point $Q_{21}$ from the values $Q_{12}$ and $Q_{11}$ of the registers $R_1$ and $R_0$, i.e., $Q_{21} \leftarrow (Q_{12}+Q_{11})/2$, and transmits the middle point $Q_{21}$ to the register $R_1$, and the value $Q_{23}$ of the register $R_3$ is transmitted to the stack memory (not shown). Also, the adder 802 and the shifter 803 calculate a middle point $Q_{32}$ from the values $Q_{23}$ and $Q_{22}$ of the registers $R_3$ and $R_2$, i.e., $Q_{32} \leftarrow (Q_{23}+Q_{22})/2$, and transmits the middle point $Q_{32}$ to the register $R_3$, and the adder 802 and the shifter 803 calculate a middle point $Q_{31}$ from the values $Q_{22}$ and $Q_{21}$ of the registers $R_2$ and $R_1$, i.e., $Q_{31} \leftarrow (Q_{22}+Q_{21})/2$, and transmits the middle point $Q_{31}$ to the register $R_2$. Also, the middle point $Q_{32}$ is transmitted to the stack memory.

Then, the adder 802 and the shifter 803 calculate a middle point $Q_{41}$ from the values $Q_{32}$ and $Q_{31}$ of the register $R_3$ and $R_2$, i.e., $Q_{41} \leftarrow (Q_{32}+Q_{31})/2$, and transmits the middle point $Q_{41}$ the register $R_3$. Also, the middle point $Q_{41}$ is transmitted to the stack memory.

Thus, the registers $R_0$ to $R_3$ of the register file 801 store the coordinates $Q_{11}$, $Q_{21}$, $Q_{31}$, and $Q_{41}$, respectively of FIG. 6, and the stack memory stores the coordinates $Q_{41}$, $Q_{32}$, $Q_{23}$, and $Q_{14}$. Note, only the coordinates $Q_{11}$, $Q_{14}$, $Q_{41}$ of the register file 801 and the stack memory are transmitted to the error calculating circuit 403 of FIG. 4 as explained below.

Figure 9:
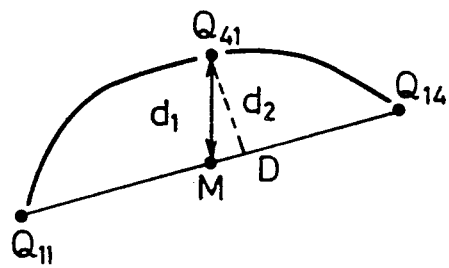
FIG. 9 is a graph showing an error calculation of the error calculating circuit of FIG. 4.

When an error (distance) between a curve such as $\overline{Q_{11}Q_{14}}$ and a line segment $Q_{11}Q_{14}$ is calculated, a configuration as illustrated in FIG. 9 is considered. In FIG.

9, the coordinates $Q_{11}$ and $Q_{14}$ are a start point and an end point of a curve, the coordinate $Q_{41}$ is a coordinate on the curve dividing the curve $Q_{11}Q_{14}$, the coordinate M is a middle point of the line segment $\overline{Q_{11}Q_{14}}$, and a point D is a cross point as a perpendicular from the coordinate $Q_{41}$ to the line segment $\overline{Q_{11}Q_{14}}$. A distance between the line segment $\overline{Q_{11}Q_{14}}$ obtained by linking the start point $Q_{11}$ and the end point $Q_{14}$ of the curve and the coordinate D on the curve dividing the curve is a distance $d_2$ between the coordinate $Q_{41}$ and the coordinate D. But, since it is difficult to obtain the crosspoint D of the perpendicular from the coordinate $Q_{41}$ to the line segment $\overline{Q_{11}Q_{14}}$, this is not practical, and therefore, a distance $d_1$ between middle point M of the line segment $\overline{Q_{11}Q_{14}}$ and the coordinate $Q_{41}$ is used as the error. Note that the middle point M of the line segment $\overline{Q_{11}Q_{14}}$ is simply obtained, and the calculated distance $d_1$ is always longer than the actual distance $d_2$. As a result, when the distance $d_1$ obtained as the error is compared with a predetermined value, the accuracy of the approximated curve (i.e., the polygonal line,) is not reduced, thus smoothing the approximated curve.

In this case, a distance between the two points is obtained. If the two coordinates are $(X_1, Y_1)$ and $(X_2, Y_2)$, the calculation of the distance is represented by the following formula (1);

$$Distance = \{(X_1-X_2)^2 + (Y_1-Y_2)^2\}^{\frac{1}{2}} \quad (1)$$

In the formula (1), multiplication and division operations are required, and this is disadvantageous in high speed processing. To carry out only addition/subtraction operations, the difference in coordinates between the two points is obtained by the following formula (2):

$$Distance = |X_1-X_2| + |Y_1-Y_2| \quad (2)$$

Thus, the operations can be simplified and can be carried out at a high speed. Also, the distance obtained by the formula (2) is always longer than that obtained by the formula (1), and as a result, when the obtained distance is compared with the error, the accuracy of a approximated curve is not reduced, thus smoothing the obtained curve.

Figure 10:
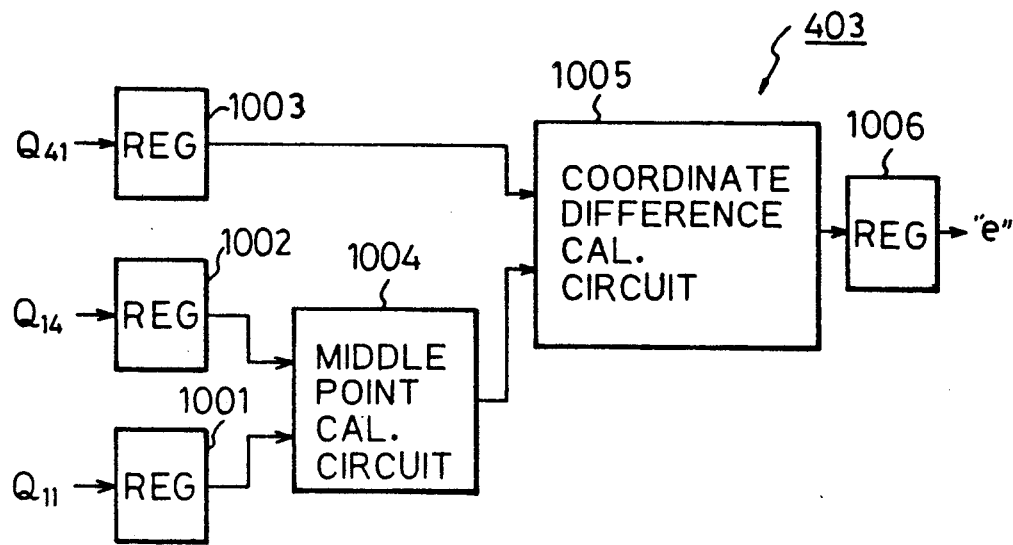
FIG. 10 is a circuit diagram of an error calculation of the error calculating circuit of FIG. 4.

The error calculating circuit 403 of FIG. 4 for calculating the error as illustrated in FIG. 9 is illustrated in FIG. 10. In FIG. 10, references 1001, 1002, 1003, and 1006 designate registers, 1004 a middle point calculating circuit for obtaining a middle point of two input coordinates, and 1005 a coordinate difference calculating circuit for calculating a coordinate error obtained by the formula (2) from the two input coordinates.

First, among a two-divided curve output from the curve dividing circuit 402, coordinates $Q_{11}$, $Q_{14}$, and $Q_{41}$ required for the calculation of an error are stored in the registers 1001 to 1003, respectively. Here, $Q_{11}$ is a start point of a curve, $Q_{14}$ is an end point of the curve, and $Q_{41}$ is a point obtained by dividing the curve having the start point $Q_{11}$ and the end point $Q_{14}$ by the ratio $t_s:1-t_s$. As a result, $Q_{11}$ and $Q_{14}$ are input to the middle point calculating circuit 1004, and therefore, the middle point M of the line segment linking the start point $Q_{11}$ and the end point is obtained at the output of the middle calculating circuit 1004. Also, the middle point M of the line segment linking the start point $Q_{11}$ and the end point $Q_{14}$ obtained by the middle point calculating circuit 1004 and the point $Q_{41}$ on the curve dividing this curve by the ratio $t_s:1-t_s$ is input to the coordinate difference calculating circuit 1005, and as a result, the difference between the two coordinates is obtained at the output of the coordinate difference calculating circuit 1005. This result is stored as the error e in the register 1006.

Note that the middle point calculating circuit 1004 of FIG. 10 is comprised of an adder 1101 and a divider 1102 as shown in FIG. 11.

The above-mentioned error e is compared with the threshold value by the error determining circuit 404, and as a result, when the error is smaller than the threshold value, the line segment $\overline{Q_{11}Q_{14}}$ is output from the data output circuit 405. Conversely, when the error is not smaller than the threshold value, the coordinates $Q_{11}$, $Q_{21}$, $Q_{31}$, and $Q_{41}$ of a curve are again input to the curve dividing circuit 402, and as a result, this curve is divided into two portions. At this time, the coordinates $Q_{41}$, $Q_{32}$, $Q_{23}$, and $Q_{14}$ of another curve are temporarily stored in the curve dividing circuit 402. Note that, in the case of FIG. 8, the coordinates $Q_{41}$, $Q_{32}$, $Q_{23}$, and $Q_{14}$ are stored in the stack memory (not shown). Then, when the division of the curve defined by $Q_{11}$, $Q_{21}$, $Q_{31}$, and $Q_{41}$ is completed, the curve defined by $Q_{41}$, $Q_{32}$, $Q_{22}$, $Q_{23}$, and $Q_{14}$ is input to the curve dividing circuit 402 and is processed.

A cubic Biziet curve is approximated to a polygonal line by the above-mentioned process.

Figure 12:
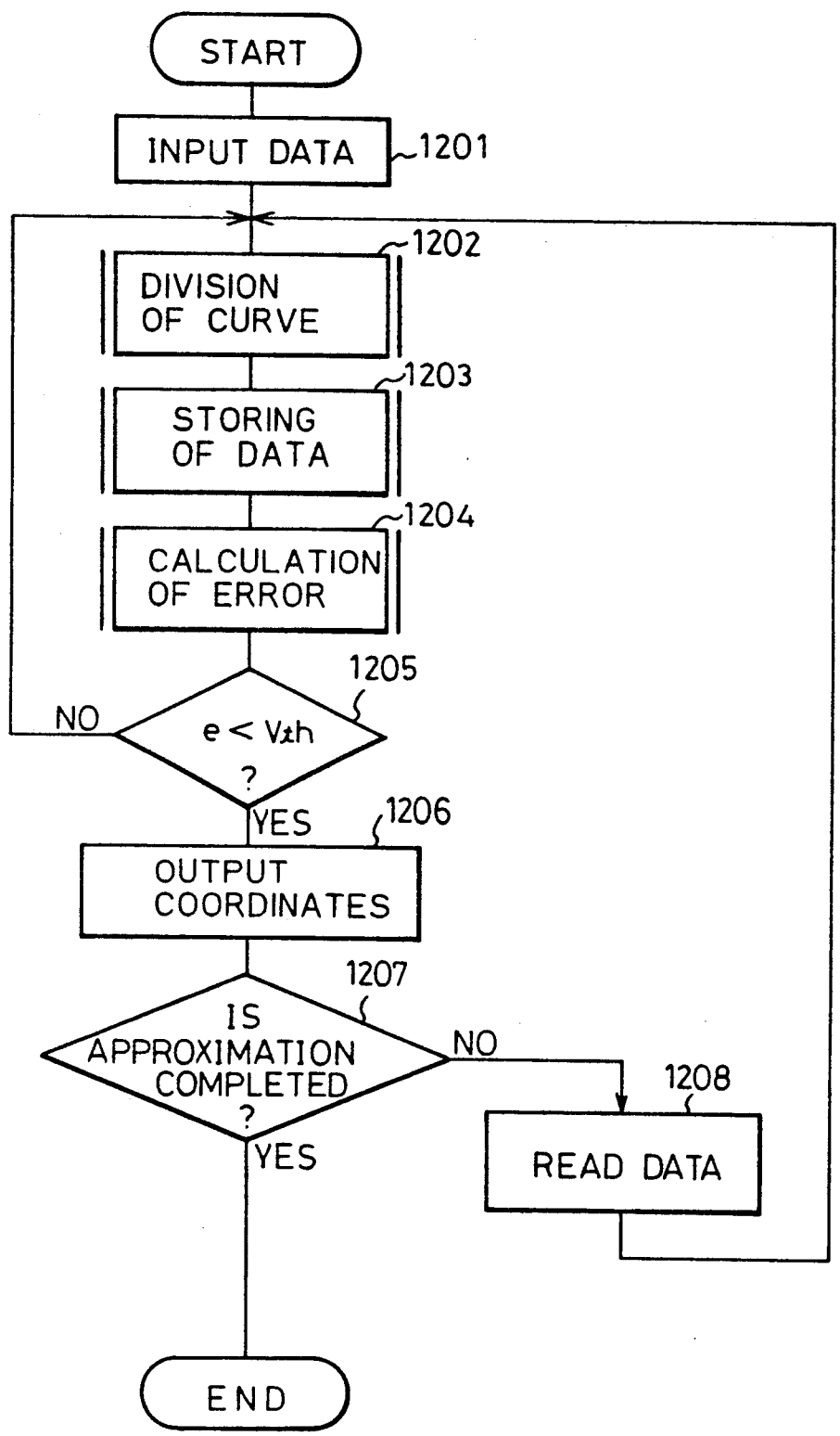
FIG. 12 is a flow chart showing another embodiment of the present invention.

The above-mentioned embodiment can be realized by programs using a general-purpose microcomputer. For example, as illustrated in FIG. 12, at step 1201, data $Q_{11}$ to $Q_{14}$ for a cubic Bizier curve is input, and at step 1202, a curve division is carried out by generating cubic Bizier curve data. Then, at step 1203, eight data $Q_{11}$, $Q_{21}$, ..., and $Q_{14}$ are stored in a random access memory (RAM); at step 1204, a distance e between the middle point of the curve defined by $Q_{11}$, $Q_{21}$, ..., $Q_{14}$ and the line segment $\overline{Q_{11}Q_{14}}$ is calculated; and at step 1205, it is determined whether or not the distance e is smaller than the threshold value $V_{th}$. As a result, when the distance $e < V_{th}$, at step 1206, the line segment $\overline{Q_{11}Q_{14}}$ is output as polygonal data. Alternatively, the above-mentioned steps 1202 to 1204 are repeated, i.e., the curve is further divided. Also, at steps 1207 and 1208 the operations at steps 1202 to 1206 are repeated until all of the line segments of a polygonal line for the curve are obtained in full.

In the above-mentioned embodiment, when an error between a curve and a line segment is calculated use is not made of control points of a cubic Bezier curve which is a special case of a parametric curve defined by $$P(t) = [t^n \; t^{n-1} \; \ldots \; t^2 \; t \; 1] \begin{bmatrix} A_{00} & A_{01} & \cdots & A_{0n} \\ A_{10} & A_{11} & \cdots & A_{1n} \\ \cdot & \cdot & & \cdot \\ \cdot & \cdot & & \cdot \\ \cdot & \cdot & & \cdot \\ A_{n0} & A_{n1} & \cdots & A_{nn} \end{bmatrix} \begin{bmatrix} Q_0 \\ Q_1 \\ \cdot \\ \cdot \\ \cdot \\ Q_n \end{bmatrix}$$

That is, a cubic Bezier curve is defined by $$P(t) = [t^3 \; t^2 \; t \; 1] \begin{bmatrix} -1 & 3 & -3 & 1 \\ 3 & -6 & 3 & 0 \\ -3 & 3 & 0 & 0 \\ 1 & 0 & 0 & 0 \end{bmatrix} \begin{bmatrix} Q_{11} \\ Q_{12} \\ Q_{13} \\ Q_{14} \end{bmatrix}$$

Where t is a variable from 0 to 1. For example, when $t=0$, $P(0)=Q_{11}$, and when $t=1$, $P(1)=Q_{14}$. Therefore, as illustrated in FIG. 13A, when the variable t is changed from 0 to 1, a curve X is obtained.

Another method of calculating an error between a curve and an approximated line segment is explained with reference to FIGS. 13A to 13D. That is, use is made of a convex envelope configuration which is a characteristic of a cubic Bezier curve. As illustrated in FIG. 13A, the actual curve X is always within a trapezoid defined by the coordinates $Q_{11}$, $Q_{12}$, $Q_{13}$, and $Q_{14}$. Therefore, a distance between the middle point $M_1$ of a line segment linking the two control points $Q_{12}$ and $Q_{13}$ and the middle point $M_2$ of a line segment linking the start point $Q_{11}$ and the end point $Q_{14}$ is always larger than a maximum distance between the actual curve X and the line segment $Q_{11}Q_{14}$, and as a result, when such a distance $M_1M_2$ is used as the above-mentioned error, the precision of a curve is not reduced.

Figure 13A:
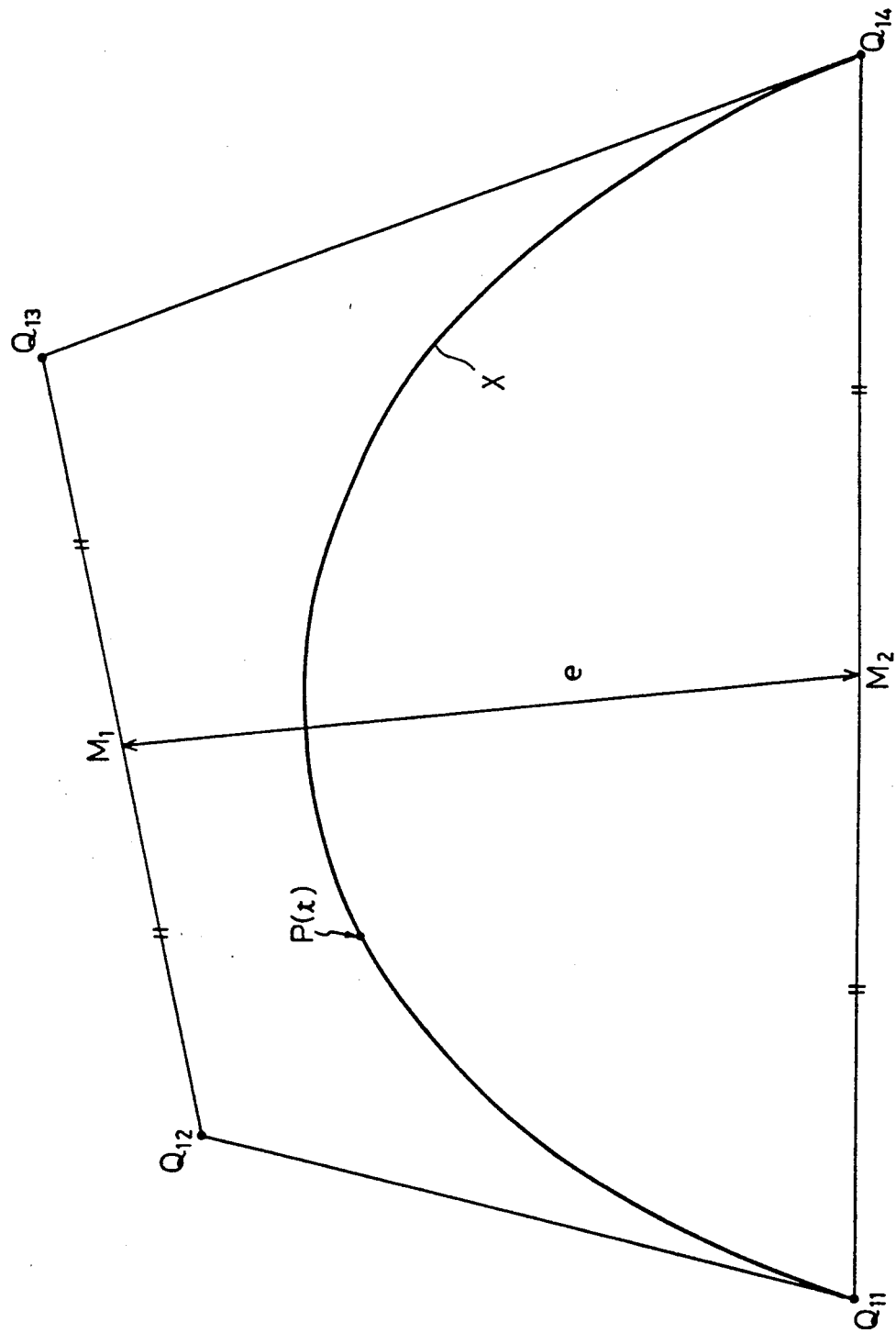
Figure 13B:
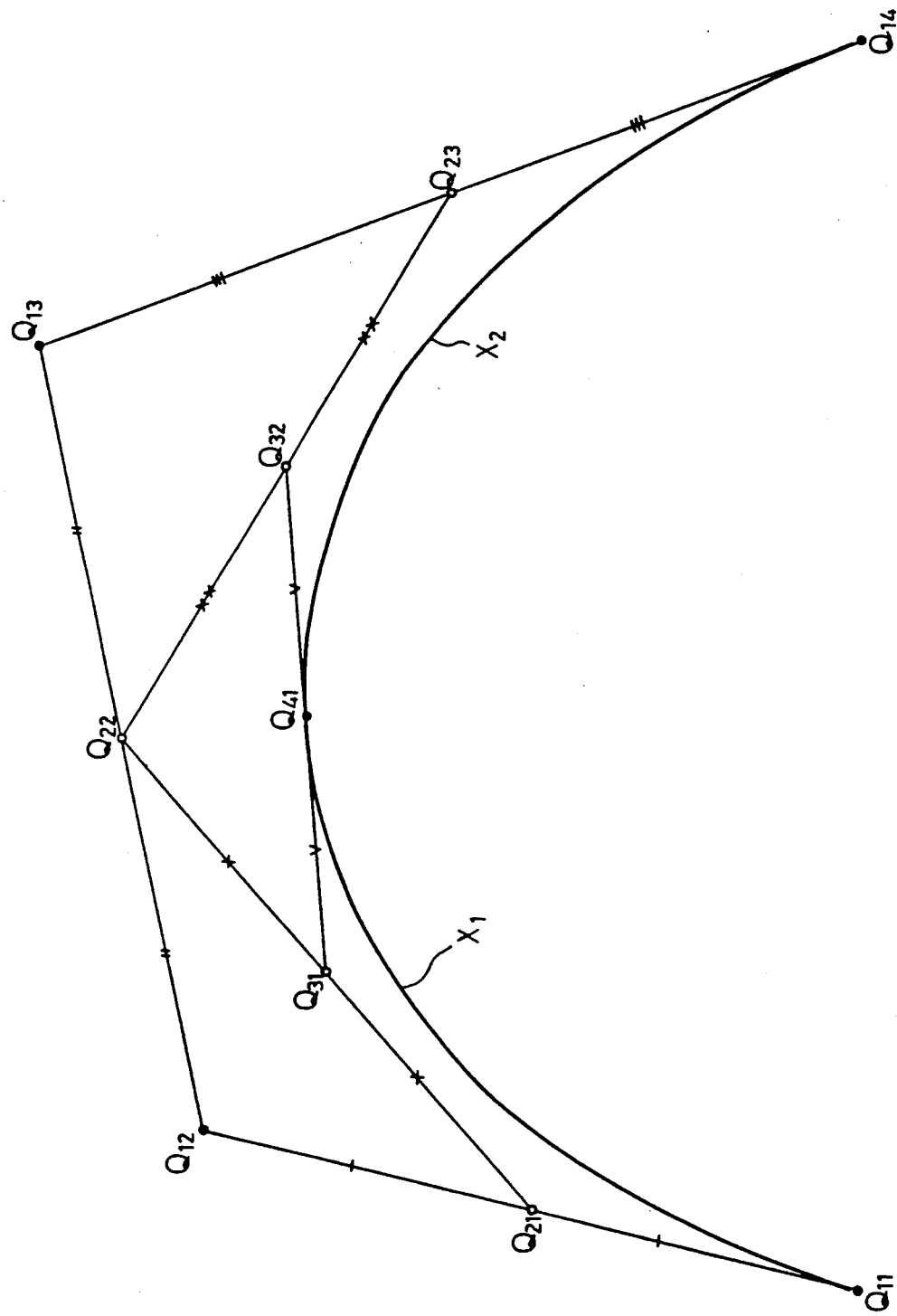

In FIG. 13A, only when the error e is not smaller than the threshold value $V_{th}$ is the curve X defined by the four coordinates $Q_{11}$, $Q_{12}$, $Q_{13}$, and $Q_{14}$ divided into a curve $X_1$ defined by four coordinates $Q_{11}$, $Q_{21}$, $Q_{31}$, and $Q_{41}$, and a curve defined by four coordinates $Q_{41}$, $Q_{32}$, $Q_{23}$, and $Q_{14}$ as illustrated in FIG. 13B.

Again, as illustrated in FIG. 13C, an error $e_1$ for the curve $X_1$ is calculated by a distance $\overline{M_{11}M_{12}}$, and an error $e_2$ for the curve $X_2$ is calculated by a distance $\overline{M_{21}M_{22}}$. For example, if the error e for the curve $X_1$ is not smaller than the threshold value $V_{th}$, the curve $X_1$ is further divided into two curves $X_{11}$ and $X_{12}$ as strated in FIG. 13D.

Figure 14:
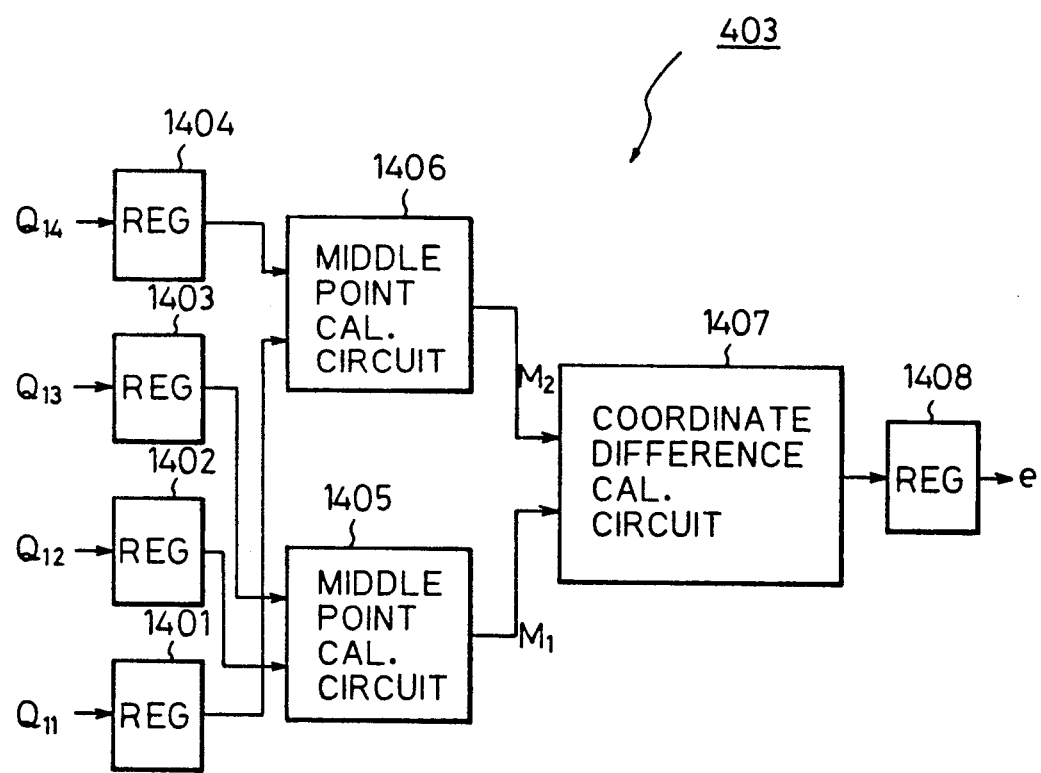
FIG. 14 is a block diagram of a modification of the error calculating circuit of FIG. 4, for carrying out the embodiment of FIGS. 13A, 13B, 13C, and 13D.

To carry out the error calculation as illustrated in FIGS. 13A, 13B, 13C, and 13D, an error calculating circuit of FIG. 14 is used instead of the error calculating circuit of FIG. 10. In FIG. 14, references 1401, 1402, 1403, 1404, and 1408 designate registers, 1405 and 1406 middle point calculating circuits for obtaining a middle point of two input coordinates, and 1407 a coordinate difference calculating circuit for calculating a coordinate error obtained by the above-mentioned formula (2) from the two input coordinates. Each of the middle point calculating circuits 1405 and 1406 is the same as that of FIG. 10, and the coordinate difference calculating circuit 1407 is the same as that of FIG. 10. For example, the middle point $M_1$ of the line segment linking the control points $Q_{12}$ and $Q_{13}$ is obtained at the output of the middle point calculating circuit 1405. Also, the middle point $M_2$ of the line segment linking the start point $Q_{11}$ and the end point $Q_{14}$ is obtained at the output of the middle calculating circuit 1406. As a result, the difference between the two middle points $M_1$ and $M_2$ is obtained at the output of the coordinate difference calculating circuit 1407. This result is stored as the error e in the register 1408.

Figure 15:
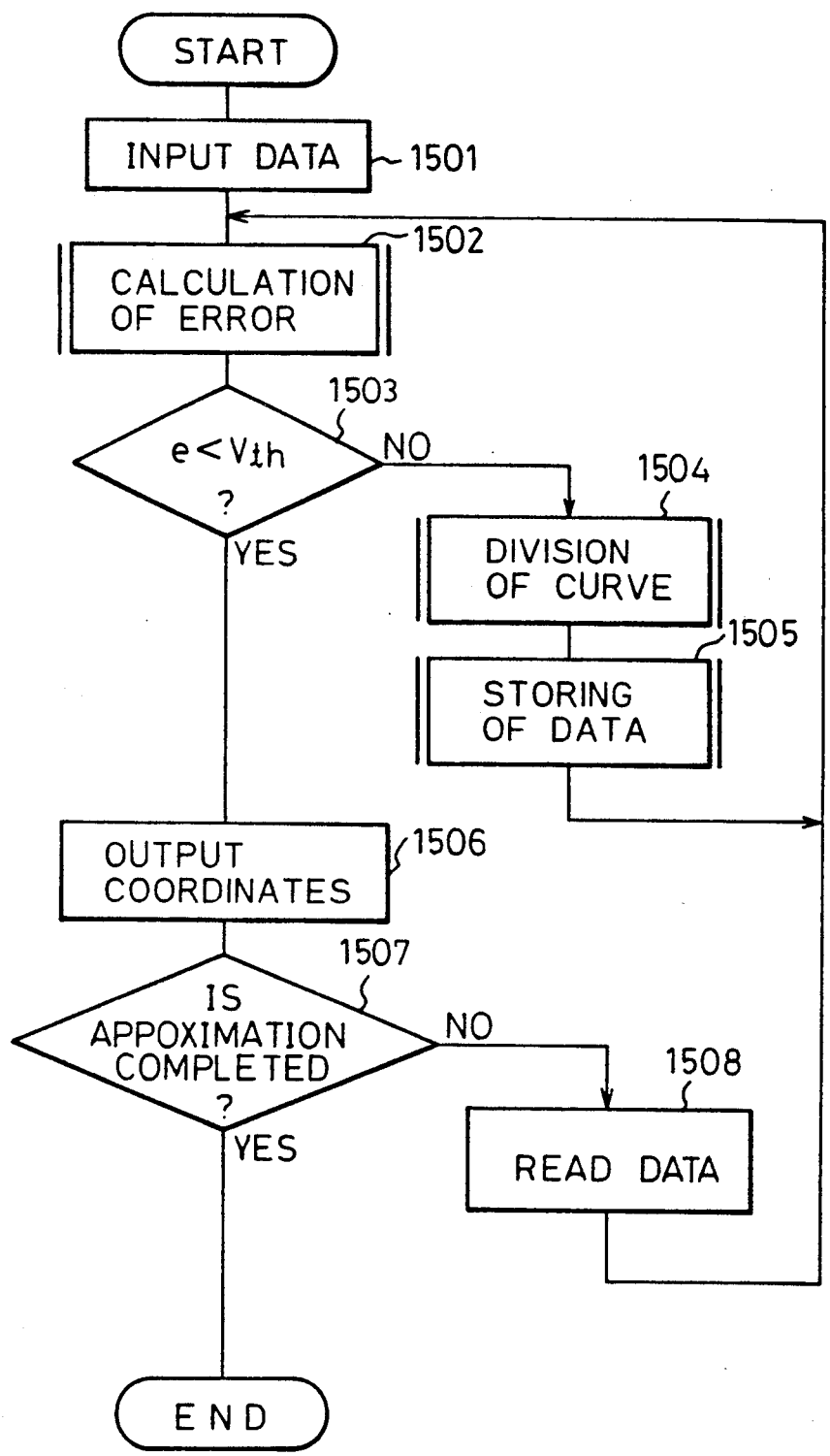
FIG. 15 is a flow chart showing a further embodiment of the present invention.

The above-mentioned embodiment using the circuit of FIG. 14 can be also realized by programs using a general-purpose microcomputer. For example, as illustrated in FIG. 15, at step 1501, data $Q_{11}$ to $Q_{14}$ for a cubic Bezier curve is input, and at step 1502, a distance (error) e is calculated in accordance with the above-mentioned formula (2). Then, at step 1503, it is determined whether or not the distance e is smaller than the threshold value $V_{th}$, and as a result, when $e<V_{th}$ value, at step 1506, the line segment $\overline{Q_{11}Q_{14}}$ is output as one line segment for a polygonal data. If $e>V_{th}$, the control proceeds to steps 1504 and 1505.

At step 1504, a curve division is carried out by generating cubic Bezier curve data, and at step 1505, eight data $Q_{11}$, $Q_{21}$, ..., and $Q_{14}$ are stored in the RAM and the control returns to step 1502.

That is, a division of a curve is repeated. Also, at steps 1507 and 1508, the operations at steps 1502 to 1506 are repeated until all the line segments of a polygonal line for the curve are obtained in full.

As explained above, according to the present invention, since the number of divisions for a curve, i.e., the number of line segments of a polygonal line for a curve, is changed in accordance with the curvature of this curve, the curve can be approximated effectively and smoothly to a polygonal line without increasing the processing time and the data amount.

We claim:

1. A method of approximating a polygonal line to a curve on a graphic display comprising the steps of:
   receiving curve diagram data;
   converting said curve diagram into a plurality of coordinate points;
   generating a plurality of line segments approximating a curve based on said coordinates wherein a number of line segments generated is based upon an amount of curvature along portions of said curve;
   converting said plurality of line segments into a graphic curve; and
   displaying said graphic curve on a display device.

2. A method of approximating a polygonal line to a curve according to claim 13 wherein said curve has a start point and an end point, said generating a plurality of line segment steps comprises the steps of:
   dividing said curve into two curve portions at a division point on said curve;
   calculating an error between a line segment linking said start point and said end point of said curve and said division point;
   determining whether or not said error is smaller than a predetermined value;
   generating said line segment as one part of said polygonal line, when said error is smaller than said predetermined value; and
   repeating the process of said error calculating step, said determining step, and said line segment generating step by replacing said curve with each of said curve portions, when said error is not smaller than said predetermined value.

3. A method as set forth in claim 2, wherein said error calculating step comprises the steps of:
   calculating a middle point of said line segment; and
   calculating a distance between said middle point and said division point, said distance serving as said error.

4. A method as set forth in claim 3, wherein said distance is a difference in coordinates between said middle point and said division point.

5. A method of approximately a polygonal line to a curve according to claim 1 wherein said generating a plurality of line segment steps comprises the steps of:

generating a start point, a first control point, a second control point, and an end point for a cubic Bezier curve;

calculating a first middle point between said first and second control points of said cubic Bezier curve;

calculating a second middle point between said start and end points of said cubic Bezier curve;

calculating an error between said first and second points;

determining whether or not said error is smaller than a predetermined value;

generating a line segment linking said start and end points of said cubic Bezier curve as one part of said polygonal line, when said error is smaller than said predetermined value; and repeating the process of said four point generating step, aid first middle point calculating step, said second middle point calculating step, and said line segment generating step, by dividing said cubic Bezier curve into two further cubic Bezier curves, when said error is not smaller than said predetermined value.

6. A method as set forth in claim 5, wherein said error calculating step calculates a distance between said first and second middle points.

7. A method as set forth in claim 6, wherein said distance is a difference in coordinates between said first and second middle points.

8. A method as set forth in claim 1 wherein said display device is a printer unit.

9. A method of approximating a polygonal line to a curve on a graphic display comprising the steps of:
receiving curve diagram data;
converting said curve diagram into a plurality of coordinate points;
generating a plurality of line segments approximating a curve based on said coordinates wherein a number of line segments generated is based upon an amount of curvature along portions of said curve, said plurality of line segments generated by the steps of
dividing said curve into two curve portions at a division point on said curve,
determining an amount of curvature of each curve portion lining said start point and said end point of said curve with said division point,
determining whether or not said amount of curvature of each curve portion is smaller than a predetermined value,
generating said line segment as one part of said polygonal line, when said amount of curvature is smaller than said predetermined value, and
repeating the process of said curvature amount determining step, said predetermined value determining step, and said line segment generating step by further dividing each of said curve portions when said amount of curvature is not smaller than said predetermined value;
converting said plurality of line segments into a graphic curve; and
displaying said graphic curve on a display device.

10. An apparatus for approximating a polygonal line to a curve comprising:
a data input circuit for generating curve portions of a start point, a first control point, a second control point, and an end point for a cubic Bezier curve;
a first middle point calculating circuit, connected to said data input circuit, for calculating a first middle point between said first and second control points of said cubic Bezier curve;

a second middle point calculating circuit, connected to said data input circuit, for calculating a second middle point of a line segment linking said start and end points of said cubic Bezier curve;
an error calculating circuit, connected to said first and second middle point calculating circuits, for calculating an error between said first and second points; and
an error determining circuit, connected to said error calculating circuit, for determining whether or not said error is smaller than a predetermined value; and
a line segment generating circuit, connected to said error determining circuit, for generating a line segment linking said start and end points of said cubic Bezier curve as one part of aid polygonal line, when said error is smaller than said predetermined value,
said error determining circuit repeating operation of said first middle point calculating circuit, said second middle point calculating circuit, and said line segment generating circuit, by dividing said cubic Bezier curve into two further cubic Bezier curves when said error is not smaller than said predetermined value wherein a number of said line segments generated is based upon an amount of curvature along each curve portion.

11. An apparatus as set forth in claim 10, wherein said error calculating circuit calculates a distance between said first and second middle points.

12. An apparatus as set forth in claim 10, wherein said distance is a difference in coordinates between said first and second middle points.

13. An apparatus for approximating a polygonal line to a curve having a start point and an end point, said apparatus comprising:
a curve dividing circuit for dividing said curve into two curve portions, at a division point;
an error calculating circuit, connected to said curve dividing circuit, for calculating an error between a line segment linking said start and end points and said division point; and
an error determining circuit, connected to said error calculating circuit and said curve dividing circuit, for determining whether or not said error is smaller than a predetermined value; and
a line segment generating circuit, connected to said error determining circuit, for generating said line segment as one part of said polygonal line, when said error is smaller than said predetermined value,
said error determining circuit repeating operation of said error calculating circuit by replacing said curve with each of said curve portions, when said error is not smaller than said predetermined value wherein a number of said line segments generated is based upon an amount of curvature along each curve portion.

14. An apparatus as set forth in claim 13, wherein said error calculating circuit comprises:
a middle point calculating circuit, connected to said curve dividing circuit for calculating a middle point of said line segment; and
a distance calculating circuit, connected to said middle point calculating circuit and said curve dividing circuit, for calculating a distance between said middle point and said division point, said distance serving as said error.

15. An apparatus as set forth in claim 14, wherein said distance is a difference in coordinates between said middle point and said division point.

* * * * *